United States Patent [19]
Nakanishi

[11] Patent Number: 5,077,624
[45] Date of Patent: Dec. 31, 1991

[54] MAGNETIC TAPE DEVICE INCLUDING OUTSERT-MOLDED TAPE GUIDE CATCHERS

[75] Inventor: Yasuyuki Nakanishi, Hyogo, Japan

[73] Assignee: Mitsubishi Denki Kabushiki Kaisha, Tokyo, Japan

[21] Appl. No.: 507,447

[22] Filed: Apr. 11, 1990

[30] Foreign Application Priority Data

Apr. 12, 1989 [JP] Japan .................................. 1-90862

[51] Int. Cl.⁵ ...................... G11B 5/027; G11B 5/008
[52] U.S. Cl. ......................................... 360/85; 360/95
[58] Field of Search ..................... 360/104, 107, 130.2, 360/130.21, 130.22, 130.23, 130.3, 130.31, 130.32, 85, 81, 83, 84, 95

[56] References Cited

U.S. PATENT DOCUMENTS

| | | | |
|---|---|---|---|
| 4,811,134 | 3/1989 | Takano | 360/85 |
| 4,959,742 | 9/1990 | Tsutsumi | 360/130.23 |

FOREIGN PATENT DOCUMENTS

| | | | |
|---|---|---|---|
| 0187157 | 8/1986 | Japan | 360/130.2 |
| 63-100655 | 5/1988 | Japan . | |
| 63-96695 | 6/1988 | Japan . | |

*Primary Examiner*—Andrew L. Sniezek
*Attorney, Agent, or Firm*—Burns, Doane, Swecker & Mathis

[57] ABSTRACT

A magnetic tape device is disclosed, which includes a magnetic head, a rotating drum on which the magnetic head is mounted, a head assembly on which the rotating drum is mounted, a drum base to which the head assembly is fixed, a pair of tape guide catchers provided on opposite sides of the drum base, and a deck base to which the drum base is fixed. The deck base includes tape guide holes, and tape guides are adapted to be moved along the tape guide holes for drawing out a magnetic tape in a cassette and bringing the magnetic tape into contact with the rotating drum. The catchers catch the tape guides, and are integrally formed with the drum base by outsert molding of resin. Both the drum base and the deck base are formed from sheet metal. The magnetic tape device can be manufactured at a low cost, and no error in positional relationship between the drum base and the deck base occurs due to temperature fluctuations.

2 Claims, 4 Drawing Sheets

MAGNETIC TAPE DEVICE INCLUDING OUTSERT-MOLDED TAPE GUIDE CATCHERS

BACKGROUND OF THE INVENTION

The present invention relates to a magnetic tape device such as a DAT (digital audio tape recorder), and more particularly to a magnetic tape device having catchers mounted to a drum base so as to ensure a perpendicularity of guide posts.

FIG. 5 is a plan view of an essential part of a DAT as the magnetic tape device in the prior art, and FIG. 6 is an elevational view of FIG. 5. Referring to FIGS. 5 and 6, the DAT includes a deck base 1 formed from a sheet metal, a pair of tape guide holes 2 formed through the deck base 1, a drum base 3 formed from a zinc die cast and fixed to the deck base 1 by means of first screws 4, a pair of catchers 5 formed from a zinc die cast and integrally formed with the drum base 3 at the front ends on the opposite sides of the drum base 3, a motor 6 fixed to the drum base 3, a fixed drum 7 fixed to the drum base 3 by means of second screws 8, a rotating drum 9 adapted to be rotated through a rotating shaft 10 of the motor 6, and a magnetic head 11 mounted on the rotating drum 9.

FIG. 7 is an elevational view of tape guide means 12 adapted to be moved along each tape guide hole 2. The tape guide means 12 is constructed of a support member 13 for supporting the tape guide means 12, a guide post 14 and a positioning post 15 extending from a lower end of the guide post 14. Each catcher 5 includes an upper stopper 16 and a lower stopper 17.

In operation, a magnetic tape (not shown) in a cassette (not shown) is pulled out by the tape guide means 12 moving along the tape guide holes 2, and is brought into contact with the rotating drum 9 and the fixed drum 7, thus reading signals on the surface of the magnetic tape. At this time, the magnetic tape is inclined at a predetermined angle (which will be hereinafter referred to as a tape inclined angle) with respect to a rotating surface of the magnetic head 11. Further, each positioning post 15 is brought into contact with the upper stopper 16 and the lower stopper 17 of each catcher 5 to thereby ensure the perpendicularity of each guide post 14.

In the above-mentioned prior art DAT, the drum base 3 and the catchers 5 are formed from a zinc die cast, while the deck base 1 is formed from a sheet metal which is low in cost. Thus, the deck base 1 and the drum base 3 formed of different materials are fixed together through the first screws 4. That is, coefficients of thermal expansion of the deck base 1 and the drum base 3 are different from each other. As a result, a change in peripheral temperature causes different amounts of expansion or contraction of the deck base 1 and the drum base 3, thereby generating distortion in shape of at least one of the deck base 1 and the drum base 3. Accordingly, there occurs an error in positional relationship between the deck base 1 and the drum base 3, with the result that the tape inclined angle cannot be maintained constant, and the perpendicularity of the guide posts 14 cannot be ensured. As a result, the magnetic head 11 cannot properly read the signals. Further, there is another problem that the catchers 5 formed from a zinc die cast must be machined to ensure an accuracy after forming.

SUMMARY OF THE INVENTION

It is accordingly an object of the present invention to provide a magnetic tape device which may be manufactured at a low cost and may properly read signals on the magnetic tape irrespective of a change in peripheral temperature.

According to the present invention, there is provided in a magnetic tape device including a magnetic head, a rotating drum on which said magnetic head is mounted, a head assembly having said rotating drum, a drum base to which said head assembly is fixed, a pair of catchers provided on opposite sides of said drum base, a deck base to which said drum base is fixed, said deck base being formed with tape guide holes, and tape guide means adapted to be moved along said tape guide holes for drawing out a magnetic tape in a cassette and bringing said magnetic tape into contact with said catchers and said rotating drum; the improvement wherein said catchers are integrally formed with said drum base by outsert molding of resin, and both of said drum base and said deck base are formed from a sheet metal.

With this construction, since the drum base and the deck base are formed from a sheet metal, there occurs no error in positional relationship between the drum base and the deck base. Furthermore, since the catchers are integrally formed with the drum base by outsert molding, a forming accuracy of the catchers can be obtained without requiring the machining after forming.

Other objects and features of the invention will be more fully understood from the following detailed description and appended claims when taken with the accompanying drawings.

DETAILED DESCRIPTION OF THE PREFERRED EMBODIMENT

Figure 4:
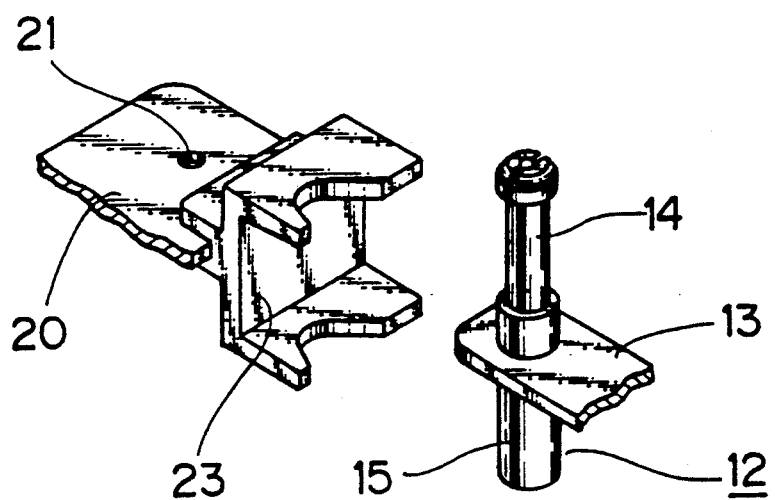
FIG. 4 is a perspective view of a catcher integrally formed with the drum base shown in FIG. 3.
Figure 5:
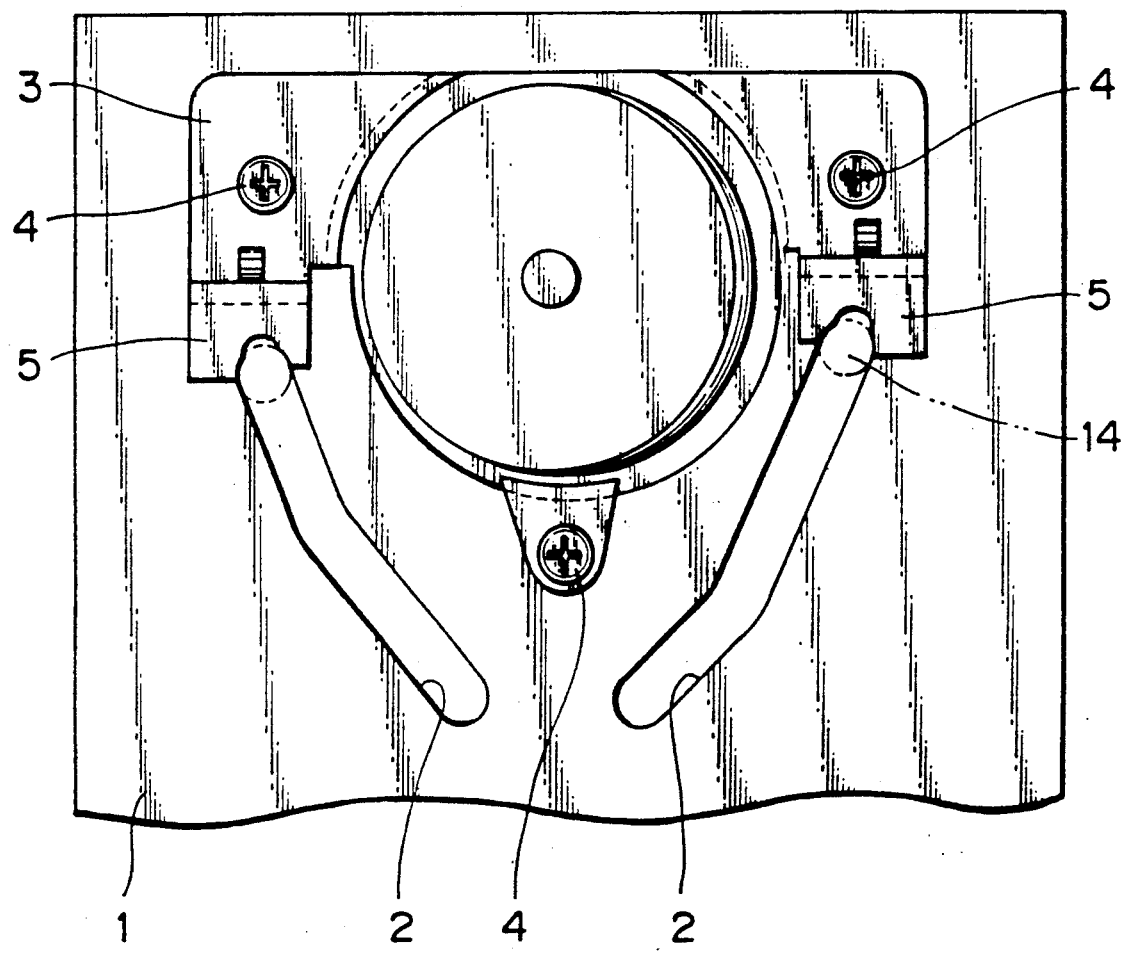
FIG. 5 is a plan view of an essential part of the magnetic tape device in the prior art.
Figure 6:
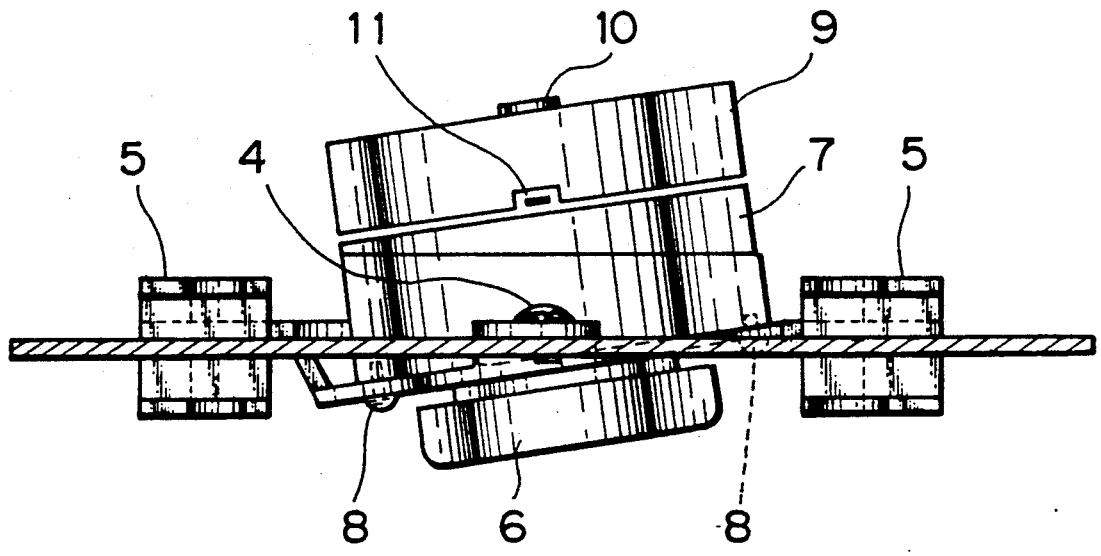
FIG. 6 is an elevational view of FIG. 5.
Figure 7:
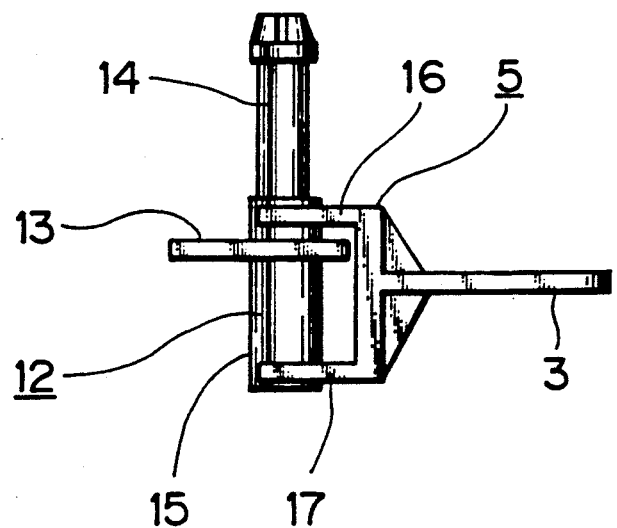
FIG. 7 is an elevational view of the catcher and the tape guide means shown in FIG. 5.

There will now be described a preferred embodiment of the present invention with reference to FIGS. 1 to 4, wherein the same or corresponding parts as those shown in FIGS. 5 to 7 are designated by the same reference numerals, and the explanation thereof will be omitted.

Figure 1:
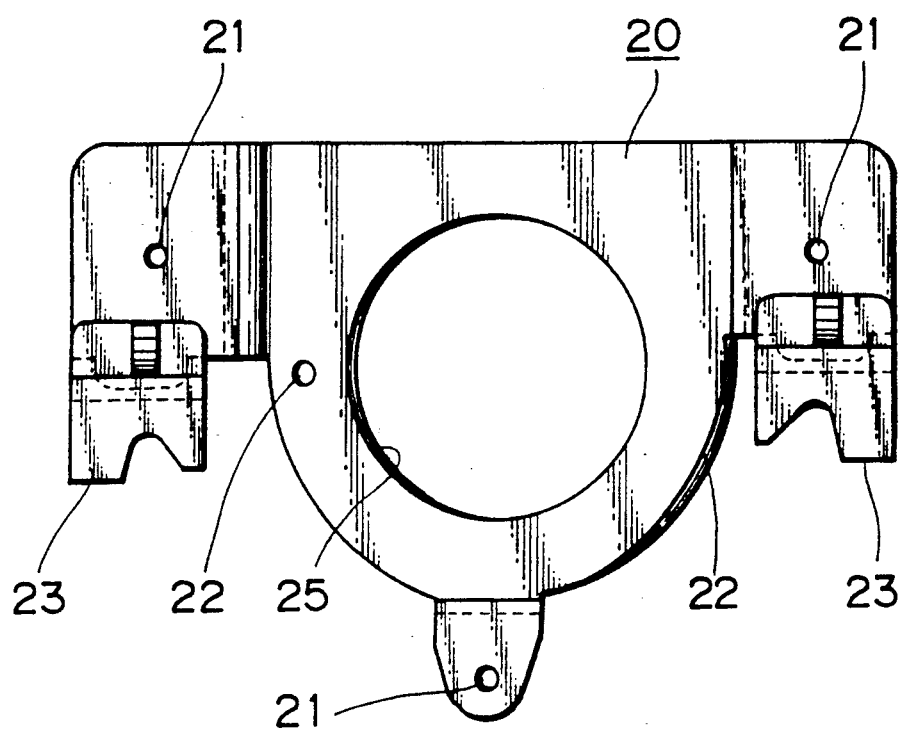
FIG. 1 is a plan view of a drum base showing a preferred embodiment of the present invention.
Figure 2:
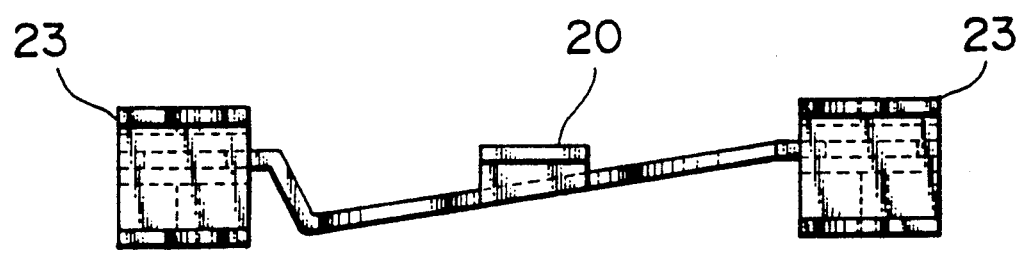
FIG. 2 is an elevational view of FIG. 1.

Referring to FIGS. 1 and 2, reference numeral 20 designates a drum base formed from a sheet metal. The drum base 20 includes a plurality of base mounting holes 21 formed at three positions, a plurality of drum mounting holes 22 formed at two positions, and a pair of catchers 23 formed of resin and provided at the front ends on the opposite sides of the drum base 20.

Figure 3:
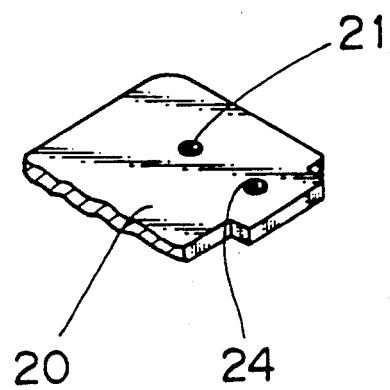
FIG. 3 is a perspective view of a part of the drum base shown in FIG. 1.

As shown in FIG. 3, the drum base 20 has a hole 24 for injecting resin therein. In the manufacture of the assembly of the drum base 20 with the catcher 23, the drum base 20 is put into a metal mold, and resin is injected on the opposite sides of the drum base 20 to outsert-mold the catcher 23. Thus, the resin is filled in the hole 24 to thereby obtain the assembly of the drum base 20 with the catcher 23 integrally formed together as shown in FIG. 4.

As mentioned above, the drum base 20 formed from a sheet metal is assembled with the catcher 23 as a unit by outsert molding. The motor 6 is mounted in a motor hole 25 of the drum base 20, and the second screw 8 are threadedly engaged into the drum mounting holes 22, thus preparing a rotary head assembly provided with the drum base 20, the catchers 23, the motor 6, the fixed drum 7 and the rotating drum 9. The rotary head assembly is mounted on the deck base 1 formed from a sheet metal, and the first screws 4 are threadedly engaged into the base mounting holes 21, thereby fixing the rotary head assembly to the deck base 1.

Although the above-mentioned preferred embodiment is applied to a DAT, the present invention may be, of course, applied to any other magnetic tape devices such as a VTR.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A magnetic tape device, comprising:
   a drum base formed of sheet metal, said drum base including a pair of molding holes therein on opposite sides of said drum base;
   a rotating drum mounted on said drum base, said rotating drum carrying a magnetic head;
   a pair of catchers formed of resin and outsert molded into said molding holes to secure said catchers to said drum base;
   a deck base formed of sheet metal, said deck base including tape guide holes therein;
   means for mounting said drum base to said deck base such that said catchers are positioned adjacent said tape guide holes; and
   tape guide means for moving along said tape guide holes into contact with said catchers and for thus guiding a tape against said rotating drum.

2. A magnetic tape device as claimed in claim 1, wherein said molding holes extend through said drum base and said resin of said catchers fills said molding holes.

* * * * *